United States Patent
Duroux et al.

[11] 3,801,896
[45] Apr. 2, 1974

[54] METHOD FOR DETERMINING THE ELECTRICAL RESISTIVITY OF THE SUBSOIL BY ELECTROMAGNETIC SURFACE WAVES AND APPARATUS FOR SUBSOIL PROSPECTING BY MEASURING ELECTROMAGNETIC FIELDS

[75] Inventors: Jean Duroux; Michel Zahaczewski, both of Paris, France

[73] Assignee: Compagnie D'Applications Et De Diffusion De Techniques Nouvelles, Paris, France

[22] Filed: Sept. 21, 1971

[21] Appl. No.: 182,392

[52] U.S. Cl. ............................................. 324/6
[51] Int. Cl. .............................................. G01v 3/12
[58] Field of Search ........ 324/3, 4, 6, 77 G; 324/34, 324/6, 77 G; 325/473; 328/65; 328/165; 340/15.5 SC; 340/15.5 SC

[56] References Cited
UNITED STATES PATENTS

| 3,212,092 | 10/1965 | Anderson et al. ........... 324/77 G UX |
| 3,538,431 | 11/1970 | Moss ........................................ 324/6 |
| 3,594,633 | 7/1971 | Barringer ................................. 324/6 |
| 3,102,231 | 8/1963 | Wolf ............................. 324/77 G X |
| 3,158,830 | 11/1964 | Clay ............................ 324/77 G UX |
| 3,270,188 | 8/1966 | Ares ............................. 340/15.5 SC |
| 3,351,859 | 11/1967 | Groth et al. ................... 325/473 X |
| 3,544,900 | 12/1970 | Beyer ............................. 325/473 X |
| 3,548,299 | 12/1970 | Duroux et al. .......................... 324/6 |
| 3,701,940 | 10/1972 | Nilsson ................................ 324/9 X |
| 3,621,380 | 11/1971 | Barlow ................................. 324/6 X |

Primary Examiner—Gerard R. Strecker
Attorney, Agent, or Firm—Sughrue, Rothwell, Mion, Zinn & Macpeak

[57] ABSTRACT

This invention relates to an improvement in the method of determining the resistance of the subsoil vertically from a given place by means of an electromagnetic surface wave emitted at a given distance from that place. The signal and the noise received at 1 are amplified and filtered at 2 and 4, while a reference signal with a constant level and the same frequency as the transmission source is transmitted to the analog multiplier 6. The maximum value of the product of the signal and the noise transmitted by 4 to the multiplier 6 and of the reference signal is taken as the proportional value of the signal received and is transmitted to the measurement device 10.

This method makes it possible to lower the frequency for the same transmitter power output and to increase the depth of the prospecting investigation.

11 Claims, 3 Drawing Figures

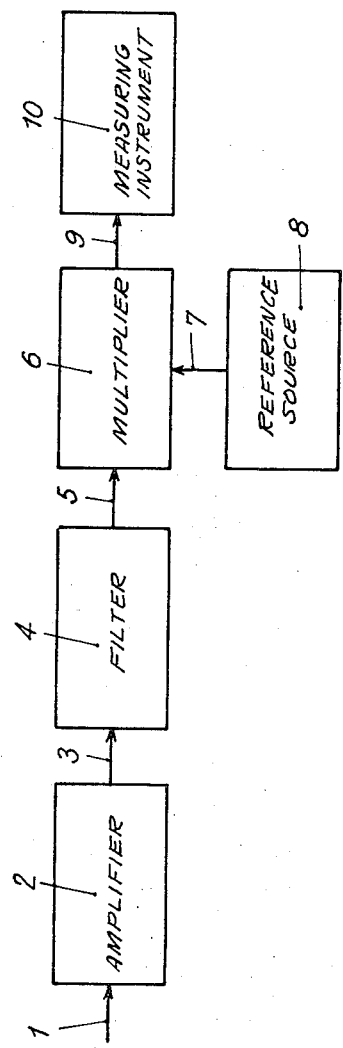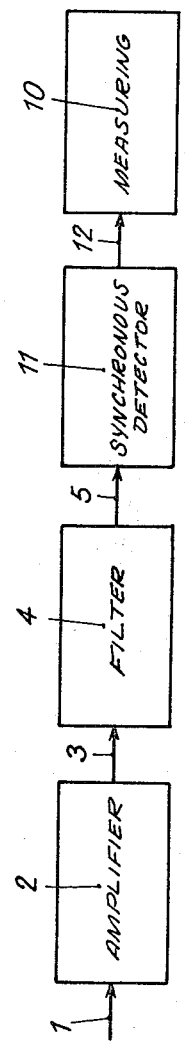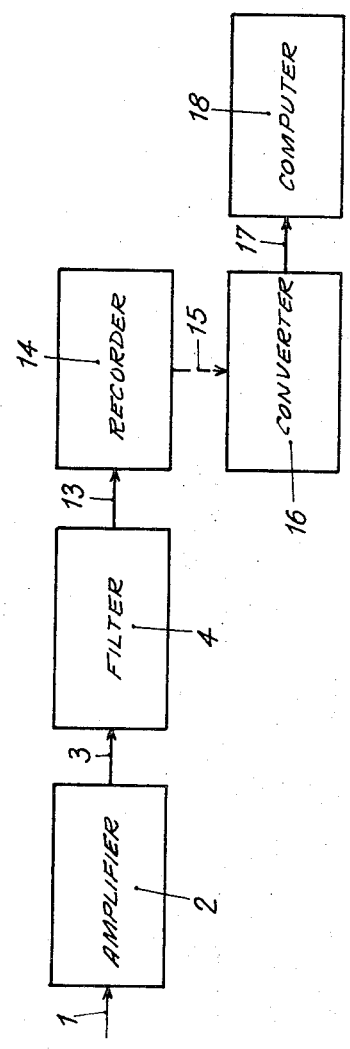

METHOD FOR DETERMINING THE ELECTRICAL RESISTIVITY OF THE SUBSOIL BY ELECTROMAGNETIC SURFACE WAVES AND APPARATUS FOR SUBSOIL PROSPECTING BY MEASURING ELECTROMAGNETIC FIELDS

The present invention, due to Messrs. DUROUX and ZAHACZEWSKI, engineers at the Bureau of Geological and Mining Research, made available to the Compagnie d'Applications of de Diffusion de Techniques Nouvelles, relates to an improvement made in French patents Nos. 1,533,337 and 1,566,338 relating to a "Method for determining the electrical resistivity of the subsoil by electromagnetic surface waves" and in French Patent No. 1,546,682 relating to an "Apparatus for subsoil prospecting by measuring electromagnetic fields". It refers more specifically to a process, as well as to means operated for its application, designed to increase the depth of the investigation range of the method for determining the electrical resistivity of the subsoil by electromagnetic surface waves which was the subject of the above-cited patents.

In accordance with these patents, a dipole is used, omitting an electromagnetic radiation in the field of very low and extermely low frequencies (from continuous to more than 30,000 hertz) and a receiver device permitting the measurement of the amplitudes of the radial magnetic, vertical magnetic and transverse electrical components of the electromagnetic field radiated by the dipole and these measurements are made for each of these components and for each frequency in a series of selected frequencies.

In these particularly favourable probing conditions, corresponding, for example, to investigation depths of from some tens to some hundreds of metres and to the use of frequencies of some tens to some ten thousand hertz, the arrangement described in U.S. Pat. No. 1,546,682 makes it possible to obtain excellent measurements with simple equipment and a modest emitting power, thus resulting in easy and inexpensive field operations.

However, if it is desired to increase the investigation depth of the system, it is essential, on account of the method used, to increase the distance between emitter and receiver and to adopt a frequency band which is the lower, the deeper the objectives to be probed and the weaker the resistivity of the terrain.

But, in these conditions, the different field components, and in particular, the transverse electrical component and the radial magnetic component decrease greatly when the frequency decreases below some tens of hertz and when the distance between the emitter and the receiver increases as is shown in particular in the table presented on page 2 of U.S. Pat. No. 1,533,337.

To obtain field values which are still measurable, it would be possible to increase the emission power, but this would necessitate such very high powers that the cost price and size of the apparatus would prohibit its use for prospecting purposes. The sensitivity of the pick-ups could also be increased, but, apart from the fact that this sensitivity is limited by considerations of size and cost price, a major difficulty arises which is the reception by the pick-ups of a very high level of electromagnetic noise of industrial and, in particular, natural origin, the noise level increasing when the frequency falls below some tens of hertz, until it exceeds the level of the signal emitted by the emitter. A very narrow filtering of the frequency band centred on the emission frequency would certainly increase the signal-to-noise ratio but would still not succeed in making the signal emerge.

The principal purpose of the present invention is a method for determining the electrical resistivity of the subsoil by electromagnetic surface waves whereby, at a place located at a distance r from the place at which it is sought to determine the resistivity of the subsoil, an electromagnetic wave is emitted at a predetermined frequency, the magnetic field components are received vertically from the place the subsoil resistivity of which is to be determined and these components are measured, the said method being characterised in that the said measurement is made for each component by amplifying the signal and the noise received by filtering them and by multiplying them with a reference signal of the same frequency as the signal received, and at a constant level, by seeking for the maximum level of the product thus obtained, this maximum being attained when the said signals are in phase, and by taking as the proportional value of the signal to be measured the maximum level detected.

The advantages of this method are very considerable. Experience shows in fact that by reason of the frequency range used and the random nature of the noise resulting from natural and industrial electromagnetic emissions, the product of the reference signal and the noise and the signal received leads to a maximum being obtained which is substantially proportionate to the signal to be measured and it becomes possible at the same time to increase the range of the subsoil resistivity determination in depth by considerable amounts compared with the depths attainable with the previous method. An excellent measurement is thus obtained even when the signal is more than a hundred times weaker than the noise and even when the noise lies within the frequency of the reference signal, this noise being generally of a random nature. In the least favourable conditions, i.e. when the noise is not random, it is possible to change slightly the frequency value considered in accordance with the previous method. Such an occasion may in fact arise since in accordance with the method described in the patents referred to, we are led to repeating the measuring operations for all the frequencies necessitated by the probing.

By way of example, with a wave generator with a straight output of 300 watts which would allow us to determine the subsoil resistivity only to a depth of 300 metres at a frequency which could not be less than 35 hertz and for a distance of 900 meters between the generator and the measuring equipment, it becomes possible to imcrease the investigation depth which can easily attain a value of 1,200 metres when the same emission source is at a distance of 3,000 metres from the place where the subsoil resistivity measurements are being made, it being possible for the frequency to fall down to 1 hertz. The advantage of this method is furthermore that it approaches nearly to the requirements for obtaining two-dimensional waves at normal incidence at the measuring point and consequently improves measuring accuracy.

In addition, it becomes possible, using a single source, to make simultaneous measurements in several places extending over a zone of several kilometres in diameter.

A further purpose of the invention is a method of the type specified above whereby the reference signal is derived directly from the source emitting the electromagnetic surface wave.

This method has the advantage of permitting perfect synchronization of the received signal to be measured and the reference signal.

A further purpose of the invention is a method of the type already specified above whereby the emission of the electromagnetic surface wave is controlled by a piezo-electric quartz crystal of comparatively high frequency, of the order of 200,000 hertz, and whereby the reference signal is produced by a generator controlled by a piezo-electric quartz crystal the frequency of which is the same to within $10^{-5}$ as that of the quartz of the emitting system in order to obtain a frequency stability which, at $10^{-5}$ or less is sufficient for an emitting frequency below 1,000 hertz.

One of the advantages of this method lies in excellent accuracy of the phase shift between the emitted radiation and the received signals since, in the case of a frequency of e.g. one hertz and utilizing only currently available and inexpensive components, the phase rotation of the signal received compared with the reference signal would by only of the order of 2° during the field measurements, it being possible to reduce this figure considerably if so desired. The emitting frequency can, moreover, be less than one hertz.

Other purposes and characteristics of the invention will be apparent from the following description made with reference to the attached drawing in which:

FIG. 1 shows in diagrammatic form a channel for receiving the signal and noise and measuring the said signal, in accordance with the invention;

FIG. 2 is a diagrammatic representation of a variant of the channel shown in FIG. 1; and FIG. 3 is a diagrammatic representation of a receiving and measuring channel in accordance with the invention but incorporating a numerical signal converter.

The receiving and measuring channel in FIG. 1 contains an input connection 1 to field probes, not shown in the drawing and supplying an input signal and some noise to the amplifier 2 connected by connection 3 to a filtering device 4. These components can be similar to those already described in the above-cited patents or can be incorporated in the device for processing the signal and the noise received. The filtering device 4 is coupled by the connection 5 to an analog multiplier 6 multiplying the signal to be measured and the noise by a constant-level reference signal of the same frequency as the signal to be measured. In the form of embodiment chosen by way of example, this signal is obtained from the device 8 connected to the multiplier device 6 by a connection 7. This device transmits the maximum value of the product obtained through a connection 9 to the measuring instrument 10.

In accordance with a first variant, the reference signal transmitter 6 is a simple wire connection or electric path of the frequency of the emission source, which is not shown in the drawing.

In accordance with another variant, the device 8 emits a reference signal of the same frequency as the signal to be measured, controlled by a piezo-electric quartz crystal, of comparatively high frequency, e.g. 200,000 hertz, which is selected so that is has a frequency identical to within e.g. $10^{-5}$ with that of a second piezo-electric quartz crystal controlling the emitter of a very low frequency electromagnetic waves used to determine the subsoil resistivity. If we assume that the selected frequency is 1 hertz, it is seen that in the least favourable conditions, no frequency shift of a full period, i.e. a phase shift of 360° occurs between the generator 8 and the generator of the emitted signals until after $10^{-5}$ seconds, i.e. about 30 hours. Thus, in 10 minutes, a sufficient time interval for making a frequency measurement of 1 hertz, the phase rotation of the generator of the emitted waves compared with generator 8 is less than 2°. It is thus seen that, for practical purposes, it is only necessary to match the quartz crystals with an even greater accuracy to obtain without difficulty performances appreciably higher than those in the example cited and, without even sacrificing the simplicity of generator 8, thermal control of the quartz crystals being virtually useless.

In the variant shown in FIG. 2, the assembly 6–8 has been replaced by a device 11, performing synchronous detection of the signals to be measured by automatic tracking in accordance with the known method of a phase-operated controlled oscillator.

Particular and simple forms of embodiment of the invention have been described with reference to FIGS. 1 and 2, in which the signal is processed at the actual time, i.e. at the actual instant of the site measurement. But is is quite obvious that it is possible to record over a sufficiently long period, of the order, e.g. of 100 times the period of the signal or more, the voltages obtained from the probes, in order to process the recording subsequently in accordance with the method which is the subject of this invention. This subsequent processing can be performed by the analog method in accordance with the simple procedure previously described, accelerating the running speed of the recording during the playback if necessary to shorten and facilitate the operation. In this case, the reference frequency is multiplied by a factor corresponding to the acceleration of the reading of the recording. Thus it is only necessary to incorporate a single recorder in connection 5 in the diagram of FIGS. 1 and 2.

The variant form shown in FIG. 3 uses a recorder 14. The connection 15 is represented in broken lines to indicate that the transfer of the recording to component 16, transforming the signals recorded in analog form into signals emitted in numerical form, can be effected either as and when they are received, or later, it being possible to transfer the signals to component 16 at a higher speed than the recording rate. The signals and the noise in numerical form are then transmitted to computer 18 where they are multiplied by a reference signal of given amplitude and of the same frequency as the signal also transmitted in numerical form. The reference signal can, if necessary, be recorded in the computer at the beginning, and match, as has been previously seen, the rate of transfer of a previous recording. The maximum product obtained is taken, in accordance with the invention, as the amplitude of the signal received.

It is also possible, in accordance with another variant form of the invention, to connect the output 13 directly to the device converting analog values into numerical values 16 and connect the output 17 of this device to the recording device 14. The numerical data contained in the recording device can then be used immediately or subsequently by the computer making the multiplication and selecting the maximum values of the products.

Although sinusoidal waves are preferably used in this process, it is obvious that other different wave forms can be used.

Similarly, as the method described, during the multiplication of the signal to be measured and the noise by the reference signal, tends to disclose the phase differences between the phase of the signal to be measured and the phase of the reference signal, the scope of the invention will not be exceeded if, instead of the amplitudes of the field components, the phase differences observed between the reference signal and the signal corresponding to the maximum value of the product are measured.

Thus it is possible either to make a sounding starting from the dephasing measurements, or to confirm and state the results of soundings obtained by amplitude measurements.

I claim:

1. In a method for determining the electrical resistivity of the subsoil by electromagnetic surface waves comprising the steps of emitting continuous electromagnetic waves having predetermined very low or extermely low frequencies at a place located at a known distance from the place at which it is sought to determine the resistivity of the subsoil, receiving the electromagnetic field component signals in the presence of noise corresponding to the radial magnetic, vertical magnetic and transverse electrical components vertically from the place at which the resistivity of the subsoil is to be determined by a measurement of the amplitudes of said electromagnetic field component signals, amplifying the received electromagnetic field component signals and noise, and filtering the amplified signals, the improvement comprising the additional steps of
    multiplying the amplified and filtered signals with constant level reference signals of the same frequencies as the received signals,
    seeking the maximum levels of the products thus obtained, the maximum levels being attained when said amplified and filtered signals and said reference signals are in phase, and
    taking the maximum levels detected as proportional values of the signals to be measured from which the electrical resistivity of the subsoil may be determined from mathematical formulas.

2. In a method in accordance with claim 1 whereby the said reference signal is derived from the emitted signal.

3. In a method in accordance with claim 1 whereby the emission signals and the reference signals are controlled by piezo-electric quartz crystals of comparatively high frequency of the order of 200,000 hertz and above, the frequency of the quartz crystals being identical within at least $10^{-5}$.

4. In a method in accordance with claim 1 whereby instead of the amplitudes or in addition to the amplitudes, the values of the phase shifts corresponding to the maximum products are measured.

5. In a method in accordance with claim 1, wherein the received signals to be measured and the reference signals are maintained in synchronism by automatic tracking according to the method using a phase-operated controlled oscillator, the amplitude and/or the corresponding phase being measured during the detection.

6. In an apparatus for determining the electrical resistivity of the subsoil by electromagnetic surface waves comprising transmitting means for emitting continuous electromagnetic waves having predetermined very low or extremely low frequencies at a place located at a known distance from the place at which it is desired to determine the resistivity of the subsoil, receiving means for receiving the electromagnetic field component signals in the presence of noise corresponding to the radial magnetic, vertical magnetic and transverse electrical components vertically from the place at which the resistivity of the subsoil is to be determined by a measurement of the amplitudes of said electromagnetic field component signals, amplifying means for amplifying the received electromagnetic field component signals and noise, and filtering means for filtering the amplified signals, the improvement comprising:
    a source of constant level reference signals of the same frequencies as said received signals,
    multiplying means for multiplying the amplified and filtered signals with said reference signals, and
    detecting means for detecting the maximum levels of the products thus obtained, the maximum levels being attained when said amplified and filtered signals and said reference signals are in phase, said maximum detected levels being proportional to the signals to be measured from which the electrical resistivity of the subsoil may be determined from mathematical formulas.

7. In an apparatus in accordance with claim 6 said source of constant level reference signals being frequency controlled by a piezo-electric quartz crystal and the transmitting means controlled by a quartz crystal of the same frequency to within at least $10^{-5}$, the said quartz crystals having a frequency of the order of 200,000 hertz and above for operating frequencies below 1,000 hertz.

8. In an apparatus in accordance with claim 6 further comprising a recorder interposed between said multiplying means and said filtering means.

9. In an apparatus in accordance with claim 8, further comprising analog-to-digital converting means connected to said recorder for converting the analog signals from said filtering means to numerical signals, and wherein said multiplying means and said detecting means are a general purpose digital computer programmed to multiply the numerical signals from said analog-to-digital converting means by a numerical reference signal and detect the maximum value of the products obtained.

10. In an apparatus in accordance with claim 9, said analog-to-digital converting means and said general purpose digital computer being located at a place remote from the rest of said apparatus and the recording produced by said recorder is processed at a time after said recording has been made by said analog-to-digital converter and said general purpose digital computer.

11. In an apparatus in accordance with claim 6, said multiplying means comprising a synchronous detector.

* * * * *

UNITED STATES PATENT OFFICE
CERTIFICATE OF CORRECTION

Patent No. 3,801,896      Dated April 26, 1974

Inventor(s) Jean Duroux et al

It is certified that error appears in the above-identified patent and that said Letters Patent are hereby corrected as shown below:

In the Heading:

The Priority Date was omitted. Should be:

-- October 5, 1970    France...............7035879 --

Signed and sealed this 10th day of September 1974

(SEAL)
Attest:

McCOY M. GIBSON, JR.      C. MARSHALL DANN
Attesting Officer           Commissioner of Patents